(12) United States Patent
Dikty et al.

(10) Patent No.: US 7,886,457 B2
(45) Date of Patent: Feb. 15, 2011

(54) COOLER FOR BULK MATERIAL HAVING A SEALING DEVICE BETWEEN ADJOINING CONVEYING PLANKS

(75) Inventors: Mario Dikty, Apensen (DE); Peter Hilgraf, Hamburg (DE); Thomas Staak, Hamburg (DE); Uwe Sprinz, Harsefeld (DE); Hartmut Meyer, Thomasburg (DE); Uwe Bock, Stade (DE); Joern Knabbe, Duedenbuettel (DE); Guenther Koeberer, Hamburg (DE)

(73) Assignee: Claudius Peters Projects GmbH, Buxtehude (DE)

( * ) Notice: Subject to any disclaimer, the term of this patent is extended or adjusted under 35 U.S.C. 154(b) by 179 days.

(21) Appl. No.: 12/377,075

(22) PCT Filed: Aug. 10, 2007

(86) PCT No.: PCT/EP2007/007102

§ 371 (c)(1),
(2), (4) Date: Feb. 10, 2009

(87) PCT Pub. No.: WO2008/017500

PCT Pub. Date: Feb. 14, 2008

(65) Prior Publication Data

US 2010/0170103 A1    Jul. 8, 2010

(30) Foreign Application Priority Data

Aug. 10, 2006 (EP) .................................. 06016751

(51) Int. Cl.
*F26B 25/00* (2006.01)
*B65G 25/04* (2006.01)

(52) U.S. Cl. ............................ 34/62; 34/236; 110/268; 110/281

(58) Field of Classification Search ...................... 34/62, 34/181, 236; 110/268, 281, 328; 198/750.2, 198/750.3; 432/77, 78
See application file for complete search history.

(56) References Cited

U.S. PATENT DOCUMENTS

2004/0222068 A1 * 11/2004 Meyer et al. .............. 198/750.2

FOREIGN PATENT DOCUMENTS

EP        0730722        4/1998

(Continued)

OTHER PUBLICATIONS

International Search Report, mailed Dec. 28, 2007, directed to counterpart application No. PCT/EP2007/007102; 2 pages.

*Primary Examiner*—Jiping Lu
(74) *Attorney, Agent, or Firm*—Morrison & Foerster LLP

(57) ABSTRACT

An apparatus for cooling bulk material with a grate flowed through by cooling gas. The apparatus comprises a plurality of planks configured to move forward and back in the direction of conveyance and, between the planks, a sealing device having spatially separate outer and inner sealing elements. The sealing device has between the sealing elements a conveying duct, which runs along the length of the planks and on which a gas supply is configured to produce a gas stream along the length of the conveying duct. Bulk material which has infiltrated through the outer sealing element can be transported away before it can reach and migrate through the inner sealing element. The accompanying sealing effect can considerably reduce the undesirable material through-fall, while enabling the use of low-wearing seals, which provide excellent wear resistance.

21 Claims, 5 Drawing Sheets

FOREIGN PATENT DOCUMENTS

| | | |
|---|---|---|
| EP | 1475594 | 11/2004 |
| WO | WO-95/10014 | 4/1995 |
| WO | WO-98/48231 | 10/1998 |

* cited by examiner

COOLER FOR BULK MATERIAL HAVING A SEALING DEVICE BETWEEN ADJOINING CONVEYING PLANKS

REFERENCE TO RELATED APPLICATIONS

This application is a national stage application under 35 USC 371 of International Application No. PCT/EP2007/007102, filed Aug. 10, 2007, which claims priority of European Patent Application No. 06 016 751.7, filed Aug. 10, 2006, the contents of which are incorporated herein by reference in their entirety.

FIELD OF THE INVENTION

The invention relates to an apparatus for cooling bulk material with a gas, which apparatus has a grate which conveys a layer of the bulk material from a feed end in a direction of conveyance to a delivery end and is flowed through by cooling gas, wherein the grate comprises a plurality of planks moved alternately forward and back in the direction of conveyance and, between adjoining planks, a sealing device is provided, comprising two mutually separate sealing elements.

BACKGROUND OF THE INVENTION

Cooling apparatuses of this type serve to cool bulk material through the use of gas, in that the bulk material is deposited as a bed onto a grate and is transported along this, while gas is supplied from beneath the grate for cooling purposes. The gas rises through the bulk material bed and cools this in the process. In cooling apparatuses of this type, the cooling grate has two functions. One function is to support the bulk material in order to form a material bed, and the other is a transport function for conveying the bulk material from a feed end to a delivery end. For the fulfillment of the two functions, various basic constructions have become known. In this context, the construction featuring a plurality of planks extending in the direction of conveyance, which planks are moved alternately forward and back, is of interest. In this conveying principle, which is also referred to as a "walking floor", one difficulty consists in the fact that at the boundaries between adjoining planks bulk material falls through into a grate pit. In coolers, unlike in comparable grates of furnaces, this poses a considerable problem. For the fallen-through bulk material steadily collects in the grate pit of a cooler, while in the grate pit of a furnace it generally combusts and thus disappears by itself. The accumulation of bulk material which has fallen through the grate is undesirable and leads to wear and ultimately damage to components of the cooling apparatus. In this context, the construction featuring the longitudinally moved planks is particularly problematical, since both a same movement between the adjoining planks and a contrary movement can take place, which must both be reliably sealed. This has proved difficult. In order to solve this difficulty, various approaches have been proposed in practice.

EP-B-0 730 722 discloses a seal which acts as a side seal between the outer moved planks and a surrounding wall of the cooling grate. It has a sealing air duct, via which sealing air is blown into a gap seal encompassing the outer edge of the planks. This arrangement calls for a really high gas stream and thus a correspondingly large-sized duct for the supply, so that it is only suitable for use on the margin of the outer planks and not between the planks.

WO-A-98/48231 discloses a seal construction in which the mutually adjacent movable planks have on their mutually facing longitudinal edges a vertically upright, raised flange. This is covered by a joint, U-shaped profile, which is open downward toward the grate. A drawback of this arrangement is that the seal is disposed in a region which is totally surrounded by bulk material. Though the seal has a long sealing gap, it is arranged such that gravitational force encourages the material to fall through.

EP-A-1 475 594 in turn discloses a sealing arrangement, which in principle is built similarly to the one described above. The sealing arrangement has, in addition to the seal on the top side, a second seal, which is arranged inversely on the bottom side and is formed with an upwardly open, U-shaped profile. Though a really good sealing effect is thereby achieved, one problem consists in the fact that material, once entered into the sealing arrangement, can only be retrieved with difficulty. It can accumulate and thus impair the effect of the sealing arrangement.

SUMMARY OF THE INVENTION

Starting from the last-named, known sealing arrangement, the object of the invention is to provide an improved sealing arrangement which further reduces the through-fall through the grate.

The solution lies in a sealing arrangement having features as broadly described herein. Advantageous refinements are the subject of the embodiments described below.

In an apparatus for cooling bulk material with a gas, which apparatus has a grate which conveys a bulk material layer from a feed end in a direction of conveyance to a delivery end and is flowed through by cooling gas, wherein the grate comprises a plurality of planks moved alternately forward and back in the direction of conveyance and, between adjoining planks, a sealing device is provided, comprising two spatially separate sealing elements, it is provided according to the invention that the sealing device also has between the sealing elements a conveying duct, which runs along the length of the planks and on which at least one gas supply for a gas stream flowing along the length of the conveying duct is configured in such a way as to convey bulk material, introduced through one of the packing seals, to a delivery point.

Some of the terms that are used are explained below.

By bulk material is understood powdery or granular material, especially clinker material.

A direction of conveyance is that direction in the plane of the grate along which bulk material present on the grate is transported from the feed end to the delivery end.

By planks moved alternately forward and back are understood board-like elongated structures, which are moved forward and also back again along their longitudinal direction. The movement is here generally controlled such that a plurality of planks move simultaneously forward, but non-simultaneously back. A conveying effect can thus be obtained, whereby it is possible to dispense with separate conveying devices on the grate.

By a conveying duct is understood a conduit which is suitable for both transporting gas and fallen-through bulk material.

By outer sealing element is meant that sealing element which separates the conveying duct from the bulk material layer. The inner sealing element separates the conveying duct from the grate pit.

The invention is based on the combination of two effects. On the one hand, the quantity of through-falling material is reduced by the dual sealing elements. On the other hand, the material which has overcome the first sealing element is intended to be carried away in a controlled manner before it can reach the second sealing element. A large part of the infiltrated bulk material (hereinafter referred to as stray material) can thus be carried away before it comes into any kind of contact with the second sealing element. The likelihood of material also crossing the second sealing element and making its way into the grate pit is thereby considerably reduced. The wear upon the second element is also thereby reduced to a minimum, so that the sealing effect is long maintained. Finally, by virtue of the conveying duct according to the invention, accumulations of stray material are also prevented. The sealing elements remain clear and are protected from damage and wear.

It is fundamentally possible to carry away stray material evacuated via the conveying duct to any chosen location. It is expedient, however, to arrange the delivery point of the conveying duct at the delivery end. The evacuated stray material then falls off at the place at which the cooled material is also ejected from the grate. However, it is not absolutely necessary to provide a separate delivery point. This can also be integrated in the outer sealing element. That region of the cooling grate which is situated at the rear in the direction of conveyance lends itself particularly well to this purpose. There, provided there is sufficient gas pressure in the conveying duct, the fed stray material can be blown out back into the bulk material bed.

The grate pit is often divided into a plurality of chambers, which, viewed in the direction of conveyance, can be differently pressurized. The invention can advantageously exploit this by providing as the gas source for the conveying duct at least one connection to one of the chambers, which chamber has a higher pressure than other chambers. By higher pressure shall here be understood that it is sufficient to generate a pressure gradient for transport of the stray material in the conveying duct. The conveying duct itself is expediently not divided into chambers, but is chamber-free. This ensures an unhindered evacuation of the stray material.

The outer and inner sealing element can preferably be formed as a gap-labyrinth seal. This seal construction is known per se for coolers of this type and has proved successful. In contrast to contact-based seals, it is low-wearing; it does, however, have a higher leakage rate. By virtue of the inventive arrangement having the conveying duct, the grate through-fall specifically does not however increase. The invention understands to decouple the leakage rate and the grate through-fall quantity. Expediently, at least one of the sealing elements is made self-adjusting. It is preferably constituted such that the nominal size of the sealing gap is reduced in manufacture to 0 mm and that in operation (due to production tolerances, different bending lines of the components bearing the sealing element) a desired gap size is quickly obtained, which persists until the sealing element is replaced. A deliberate wear is thus produced, to be precise up to a desired target gap size. With such a bedding-in process, the target gap size can ultimately be set more accurately than would be possible in the case of a direct manufacture.

Expediently, the outer sealing element is arranged lower than the inner sealing element. Gravitational force thus additionally deters stray material from passing from the outer sealing element through the conveying duct to the inner sealing element.

Preferably, the sealing device has a protruding bar on a longitudinal edge of one of the planks and a branched profile, reaching over the bar, on one of the adjoining planks. A gap seal can thus be realized in a simple manner, which acts as the outer sealing element. In the case of a downwardly open arrangement of the branched profile, said gap seal is also broadly protected from the introduction of bulk material. Expediently, it is provided that a free end of the branched profile interacts with the bar. The bar can have a rectangular cross section. It preferably, however, has a step, the flanks of which form a labyrinth seal with the free end of the branched profile. An even better sealing effect is thereby achieved. In addition, it is preferably provided that the branched profile has an additional branch to form a so-called U-shaped profile. That branch is fastened to an upwardly projecting flange disposed on the adjoining plank in order thus to achieve a seal also with respect to the adjoining plank.

Preferably, on the adjoining plank an auxiliary bar is arranged, which forms with the bar a gap seal as the inner sealing element. This means that the bar can be used not only to form the outer sealing element, but also to form the inner sealing element. The number of required parts is thereby minimized. Expediently, the auxiliary bar is here configured as an L-shaped profile. Particularly preferably, the auxiliary bar is arranged in an upright element of the adjoining plank such that the inner sealing element which it forms is arranged higher than the outer sealing element. Gravitational force thus deters the stray material from being transported from the outer to the inner sealing element. The aforementioned upright element can preferably be formed by the upwardly projecting flange.

Expediently, on the mutually opposing longitudinal sides of adjoining planks, downwardly protruding end plates are provided and form a gas duct, which emerges via the inner sealing element into the conveying duct. The conveying duct is here expediently shaped such that it has a cross section which is roughly 10 to 80 times, preferably 15 to 50 times as large as that of the sealing elements.

Preferably, the inner sealing element is designed such that its flow resistance is less than that of the outer sealing element. The effect is that the gas flowing in the conveying duct does not flow backward through the outer sealing element back into the bulk material bed. The risk of blockages of the outer sealing element by recycled stray material is thereby eliminated. A ratio of, for example, 1:2 to 1:50 has proved successful.

It can be expedient to configure the inner sealing element between an inner face of the branched profile and an auxiliary plate disposed on the bar. The inner sealing element is thereby located high up in the conveying duct. Infiltrated stray material can barely reach it. It is thus well protected from wear. Moreover, this arrangement is robust against unfavorable tolerances or against a sealing gap enlarged by bending loads. In such cases, too, material through-fall would not occur, or only to a very small extent.

BRIEF DESCRIPTION OF THE DRAWINGS

The invention is explained in greater detail below with reference to the appended drawing, in which an advantageous illustrative embodiment of the invention is represented and in which.

DETAILED DESCRIPTION OF THE INVENTION

Figure 1:
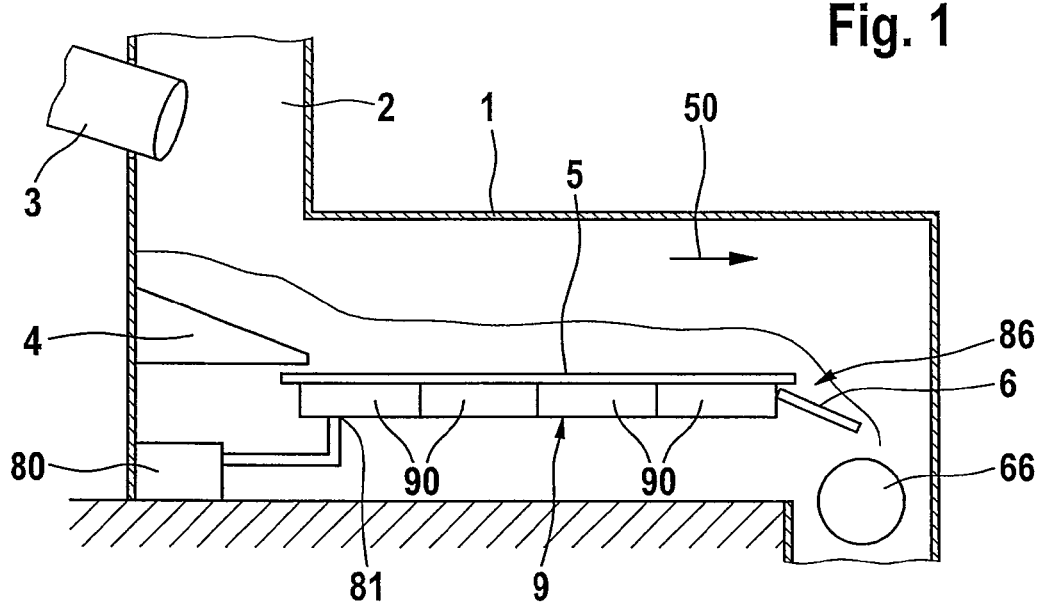
FIG. 1 shows a schematic side view of a cooling apparatus according to an illustrative embodiment of the invention.

In FIG. 1, a schematized view of a cooling apparatus and its integration in a cooling plant is represented. Located at the beginning in a cooler housing 1 is a feed shaft 2, into which a discharge pipe 3 of an upstream rotary furnace (not represented) emerges. Material emanating from the rotary furnace falls into the feed shaft 2 onto a cooling grate, more precisely onto its feed end 4. It has a slightly downward-sloping, ramp-shaped design, so that the deposited material slides in the direction of a horizontally disposed main portion of the grate. If the grate is referred to below without further detail, then this main portion 5 of the cooling grate is meant. It has a plurality of longitudinally movable planks 51-53, which exert a conveying effect upon the material such that it is led away from the feed end 4 and along the grate 5. At the opposing ends, the grate has a delivery end 6, that in the illustrative embodiment is configured as an inclined skidpan. It serves to discharge the cooling material in a purposeful manner at the delivery end, for example onto an underlying crusher 66.

Figure 2:
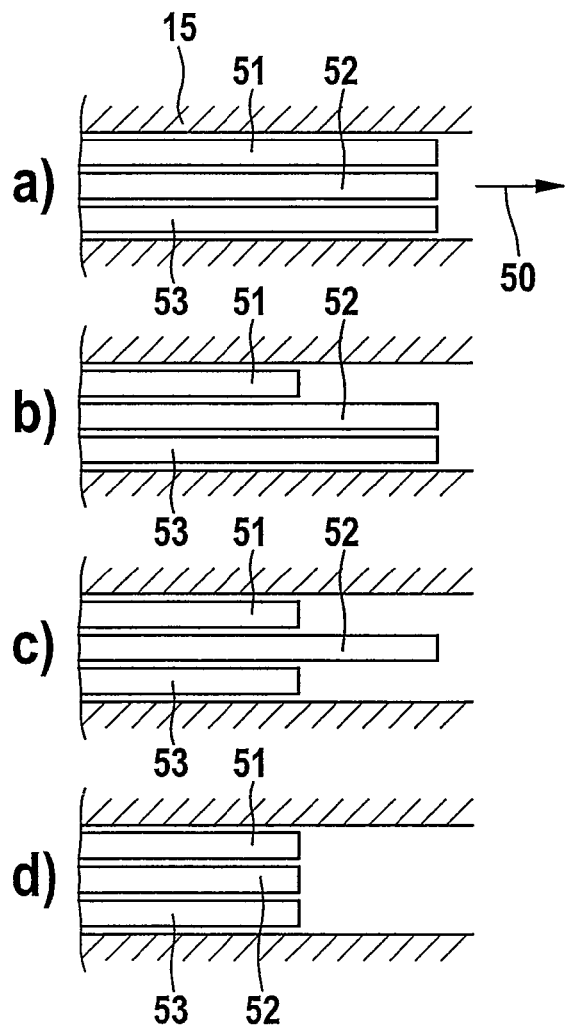
FIG. 2 shows schematic views of different work stages of a grate of the cooling apparatus.

The structure of the grate 5 in schematized representation, and its working method, are represented in FIG. 2. As already stated, it consists of a plurality of mutually adjacent elongated planks 51-53. The working principle for the transport of the bulk material in a direction of conveyance 50 is represented with its basic phases in the individual diagrams of the figure. The basic principle of this illustrative embodiment is a motional sequence in which all planks 51-53 move in the direction of conveyance 50. In FIG. 2a, a phase of the cycle is depicted in which the planks 51-53 are moved into their front end setting. The next phase is represented in FIG. 2b. The plank 51 is retracted until it reaches its rear end setting. For the phase represented in FIG. 2c, the plank 53 moves back until reaching its rear end setting. Finally, the plank 52 also moves into its rear end setting, so that the position represented in FIG. 2d is reached. The cycle then begins anew. In this way, a pattern of motion is obtained, in which all planks are jointly moved forward, while they are individually retracted one after the other. It should be pointed out that it is not absolutely necessary for all forward moving planks to have the same speed. In accordance with the normally occurring speed profile of the bulk material, it can also be provided that the marginal planks 51, 53 move more slowly than the centrally arranged plank 52.

Figure 3:
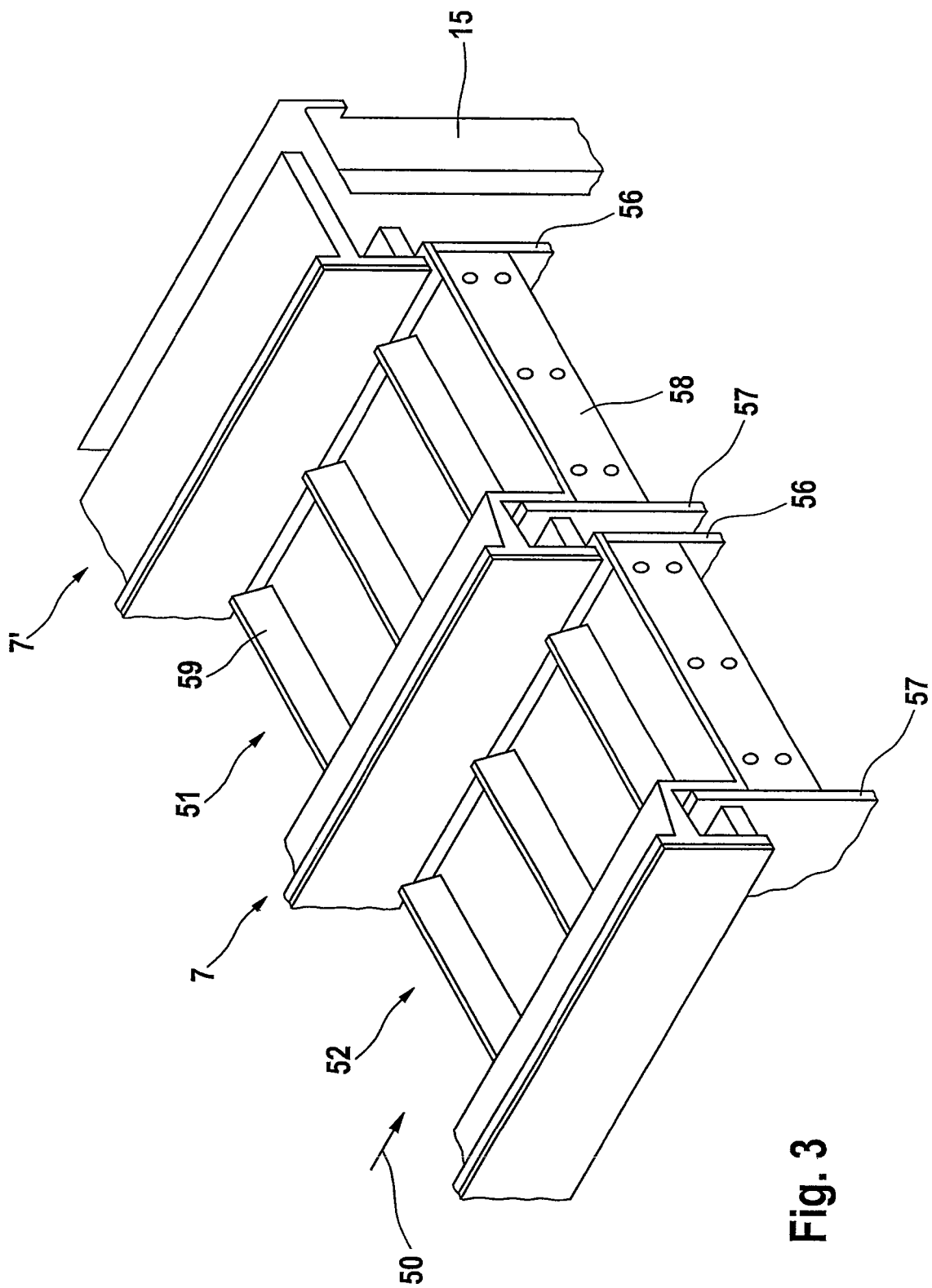
FIG. 3 shows a cross-sectional view through a part of the cooling apparatus.

FIG. 3 shows a cross-sectional representation over a part of the grate width according to the illustrative embodiment of the invention. At the right-hand edge of the picture, a side wall 15 for the grate is represented. The side wall 15 can be realized as a stand-alone wall structure which delimits the grate to the side. It can also, however, be realized in combination with a side wall of the housing 1, in which case the side wall 15 forms a bracket-like protrusion on the side wall of the grate space. The first plank 51 and the second plank 52 are respectively disposed one after the other from right to left; other following planks are not represented for simplification reasons. However, the equivalent applies in terms of their structure. The planks 51, 52 have on their surface a plurality of evenly spaced ribs 59, which are orientated transversely to the direction of conveyance 50. They serve to improve the frictional engagement between the planks 51, 52 beneath the overlying bulk material. They also form pockets between them, which are filled with bulk material. The surface of the planks 51, 52 is thus not directly subjected to hot bulk material and is thus protected from harmful effects due to heat and abrasion from the hot bulk material. On their front side, the planks 51, 52 have partition walls 58. Extending respectively on the longitudinal edges of the planks 51, 52 are downwardly protruding end plates 56, 57. Between the main surfaces of mutually opposing end plates 56, 57 of adjoining planks 51, 52, a gas supply duct can be formed. This will be explained in greater detail later. The partition walls 58 are preferably arranged in multiple at regular intervals along the length of the planks 51, 52. Together with the end plates 56, 57, chambers 90 are thereby formed on the grate 5, which chambers can be pressurized with compressed gas. It is here possible to subject the individual chambers 90 to different pressures in order thus to achieve a desired distribution of the compressed gas along the extent of the grate 5.

Between adjoining planks 51, 52, there is respectively provided a sealing device 7 extending along the longitudinal edges. For the sealing of the most marginal plank 51, together with the wall structure 15, a modified sealing device 7' is provided. The structure and the working method of the sealing device 7 are explained in greater detail below with reference to FIG. 4. The sealing device 7 essentially comprises a bar 71 and a branched profile 77 which reaches over said bar. The bar 71 is arranged, via a mounting adapter, on the top edge of one of the planks 51. The bar has a substantially rectangular profile and extends over the entire length of the plank 51. It terminates, in the direction of the outer side, flush with the outer face of the end plate 56 of the plate 51. On its opposite side orientated toward the rib 59, the bar 71 preferably has a step 72. The step 72 can be formed particularly easily by a two-part version of the bar 71, in which two bar elements of rectangular cross section are arranged mutually offset. The step 72 serves to interact with the branched profile 77.

The branched profile 77 is of generally U-shaped design. It comprises a main branch 78 and an auxiliary branch 79, connected by an intermediate piece. Preferably, the main branch 78, the intermediate piece and the auxiliary branch 79 are realized in one piece. The branched profile 77 is disposed on the end plate 57 of the adjoining plank 51. The dimensions are here chosen such that said branched profile reaches over the bar 71 with a main branch 78 in such a way that the main branch 78 engages with its free end in the step 72 of the bar 71. At the same time, the outer side of the main branch 78 terminates flush with the outer side of the bar 71 that points toward the rib 59. Between the bar 71 and the free end of the main branch 78, a gap seal is formed, which acts as the outer sealing element 70. Due to the engagement of the free end in the step 72, the gap of the outer sealing element 70 has a 90° bend. It thus constitutes a labyrinth seal.

Figure 4:
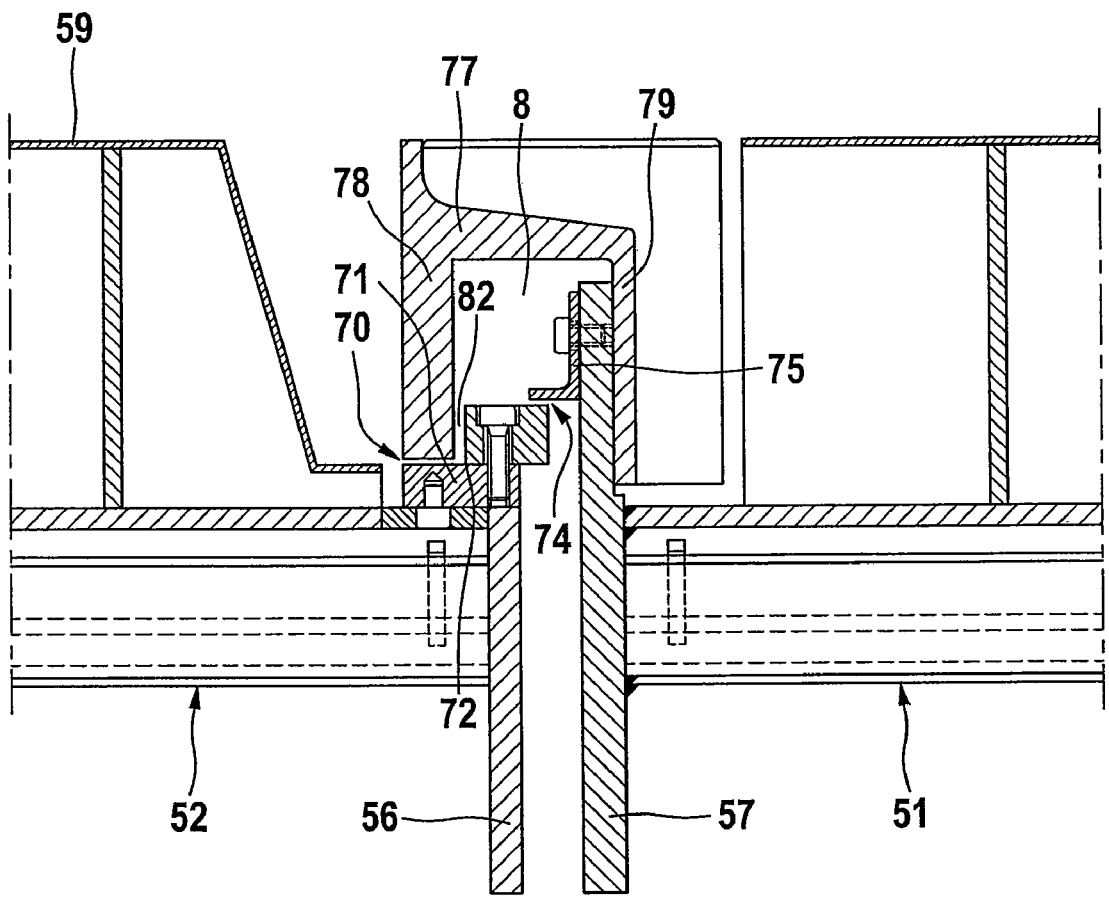
FIG. 4 shows a cross-sectional view of a first embodiment of a sealing arrangement according to the invention.

In addition, an inner sealing element 74 is provided. For this purpose, an auxiliary bar 75 is disposed on the auxiliary branch 79. This auxiliary bar 75 has an L-shaped cross section. It is fastened to the auxiliary branch 79 by its longer branch, and its shorter, free branch protrudes perpendicularly thereto in the direction of the bar 71. It should be pointed out that the auxiliary bar 75 does not necessarily have to be disposed directly on the auxiliary branch 79. In FIG. 4, a preferred variant is represented, in which the auxiliary branch 79 back-grips a portion of the end plate 57 which projects upward in the manner of a flange, and the auxiliary bar 75 is arranged correspondingly on this flange region of the end plate 57. The auxiliary bar 75 interacts with its protruding branch preferably with the top side of the bar 71 such that, between them, a gap is formed. This acts as a sealing gap of the inner sealing element 74. The sealing gap of the outer sealing element 70 has, for example, a 2 mm width. The sealing gap of the inner sealing element 74 can be roughly equal in size, but is expediently dimensioned such that the flow resistance of the inner sealing element 74 is less than that of the outer sealing element. For example, the sealing gap of the outer sealing element 70 has a cross section of 0.5 cm$^2$ in respect of a 2 mm gap, and the inner sealing element has a cross section of 0.2 cm$^2$ in respect of a likewise 2 mm gap.

The outer sealing element 70 and the inner sealing element 74 delimit a conveying duct 8 framed by the branched profile 77. For this purpose, the branched profile 77 forms with the bar 71 and a prominent part of the end plate 57 a gas space of roughly rectangular cross section. The conveying duct 8 is connected by a narrow interstice 82 and the outer sealing element 70 to the top side of the grate plank 51, i.e. to the top side of the grate 5. In addition, the conveying duct 8 is connected to an interstice formed between the mutually facing surfaces of the adjoining end plates 56, 57. It forms a connection with grate pit 9. The sealing elements 70, 74, by virtue of their construction as gap seals, where appropriate as labyrinth seals, are hard wearing and provide guaranteed sealing tightness even in the event of a longitudinal movement of the adjoining planks 51, 52 relative to each other. Such a longitudinal movement has no bearing on the sealing tightness.

The conveying duct 8 serves to carry away infiltrated stray material. For this purpose, a propellant gas source 80 can be provided on the feed-side end of the grate 5. It supplies a gas via a corresponding propellant gas connection 81, the propellant gas flowing along the conveying duct 8 to the delivery side end 6, and emerges there. The result is that any introduced stray material which enters through the outer sealing element 70 into the conveying duct 8 is transported away along this to a delivery point 86 arranged at the delivery end 6 before it reaches the inner sealing element 74 or might even traverse this and thus reach the grate pit 9. By virtue of the evacuation into the conveying duct 8, the quantity of stray material which finally reaches the grate pit 9 can thus be considerably reduced. Given the above-stated dimensions of the sealing elements 70, 74, for example, the conveying duct 8 has a cross section of 32.5 cm$^2$.

It is not absolutely necessary that the propellant gas required for the conveyance into the conveying duct 8 is supplied via a separate propellant gas connection 81 from a separate propellant gas source 80. It can also be provided to supply the propellant gas via the interstice between the end plates 56 and 57, to be precise preferably in the region of the feed end 4. This produces a (desired) gas flow through the inner sealing element 74 such that the gas flows into the conveying duct 8. Due already to this inflow, stray material is thus deterred from passing out of the conveying duct 8 through the inner sealing element 74.

It is often provided that the grate pit 9 is divided into various chambers. Accordingly, the conveying duct 8 can also be divided into chambers. This is not absolutely necessary, however. It can also be provided that the conveying duct 8 is continuous, while the grate pit 9 is divided into chambers. It is important that the propellant gas supply is chosen such that, along the entire length of the conveying duct 8, a sufficient (positive) pressure gradient between the pressure in the duct 8 and above the grate 5 is given at the respective location.

Figure 5:
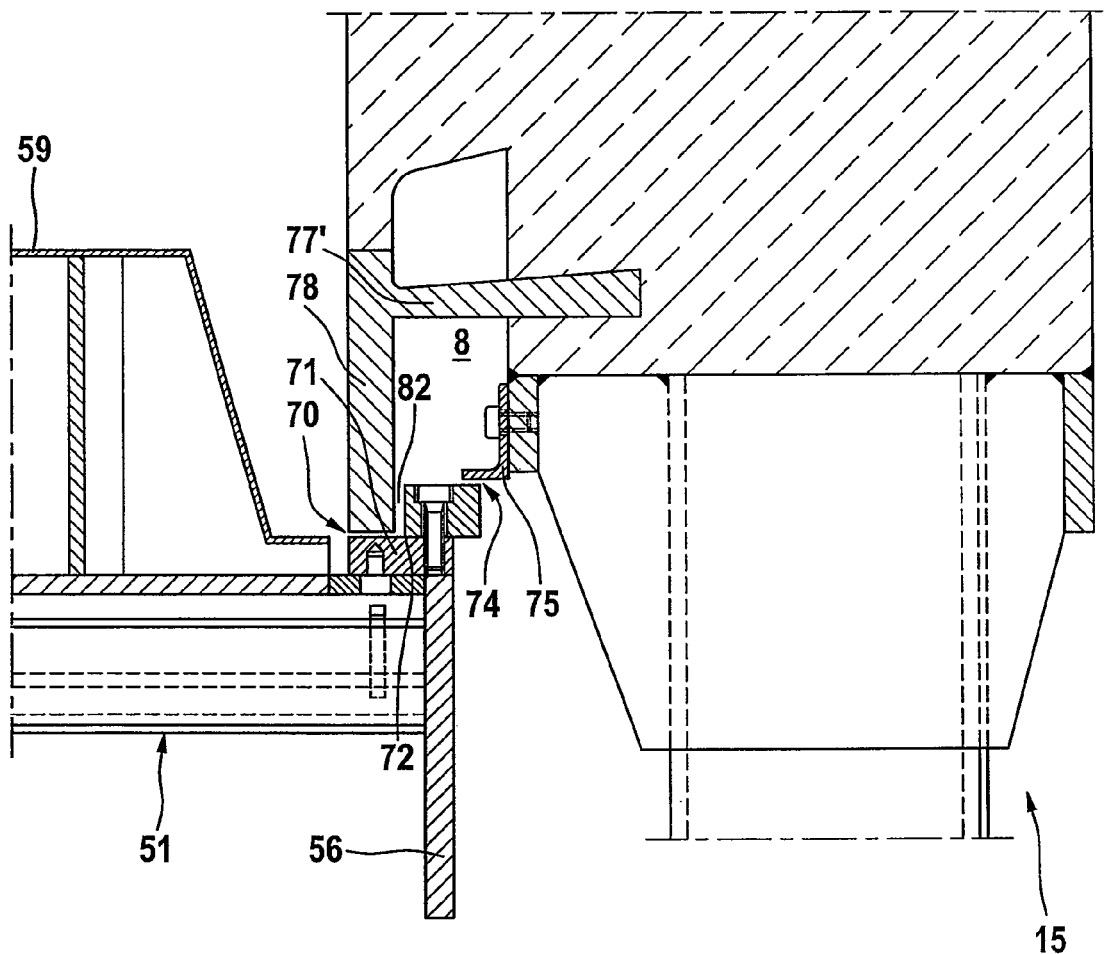
FIG. 5 shows a cross-sectional view of a second embodiment of a sealing arrangement according to the invention.

The sealing device 7' is correspondingly configured. As is represented in FIG. 5, an outer sealing element 70 and an inner sealing element 74 is similarly formed by a step 72 on the bar 71 and between the bar 71 and the auxiliary bar 75, respectively. The difference lies in the fact that the branched profile 77' has no auxiliary branch 79, but rather is fixedly connected to the side wall 15. The advantage of this design is that all elements involved in the formation of the seal, inclusive of the main branch 78 of the branched profile 77', can be constituted precisely the same as in the sealing device 7 between the adjoining planks 51, 52. The sealing device 7' thus achieves the same advantageous sealing effect.

Figure 6:
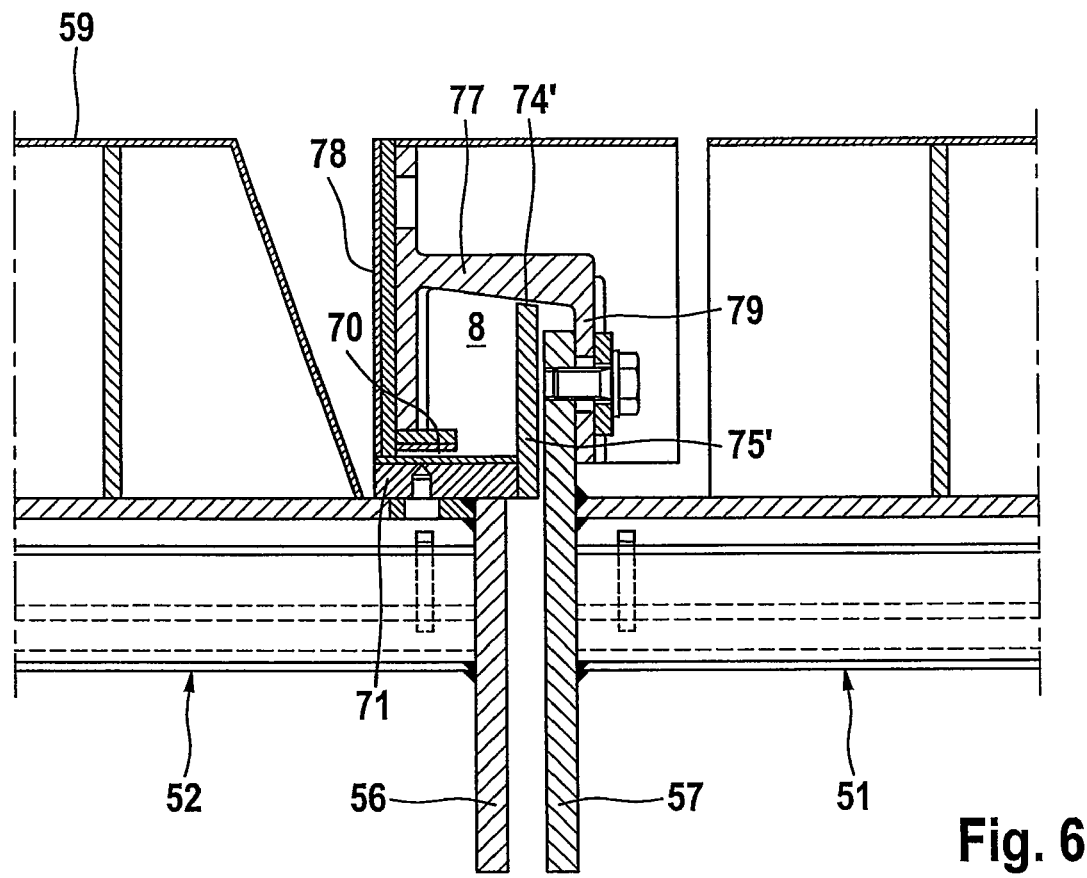
FIG. 6 shows a cross-sectional view of a third embodiment of a sealing arrangement according to the invention.

The third embodiment represented in FIG. 6 differs from the first embodiment represented in FIG. 4 essentially by a different arrangement of the inner sealing element 74'. This difference is explained in greater detail below; otherwise, the comments made with respect to FIG. 1 apply analogously. In the first embodiment, the inner sealing element 74 is formed between the bar 71 and an auxiliary bar 75, which are disposed in the lower region of the conveying duct 8. In the third embodiment, the inner sealing element 74' is formed between an inner face of the branched profile 77 and an auxiliary plate 75' disposed on the bar 71. The auxiliary plate 75' is arranged, projecting upward at right angles, on that face of the bar 71 which points toward the end plate 57. The upper end of the auxiliary plate 75' meets the inner face of the intermediate piece of the branched profile 77 and thus forms the gap of the inner sealing element 74'. Owing to its higher specific density compared to the propellant gas, stray material which has made its way into the conveying duct 8 appears mainly in the lower region of the conveying duct 8.

The inner sealing element 74', by virtue of its high-situated arrangement at the upper end of the auxiliary plate 75', is subjected only weakly, or not at all, to the stray material. The wear to the inner sealing element 74' is thus reduced to an almost negligible minimum. In addition, this arrangement of the inner sealing element 74' has the advantage that, even in the case of a worn or defective sealing element, the quantity of stray material which finally reaches the grate pit 9 is very small. This embodiment of the sealing element 74' is thus not only hard wearing, but is also robust against unfavorable tolerances or against a sealing gap enlarged by bending loads.

Figure 7:
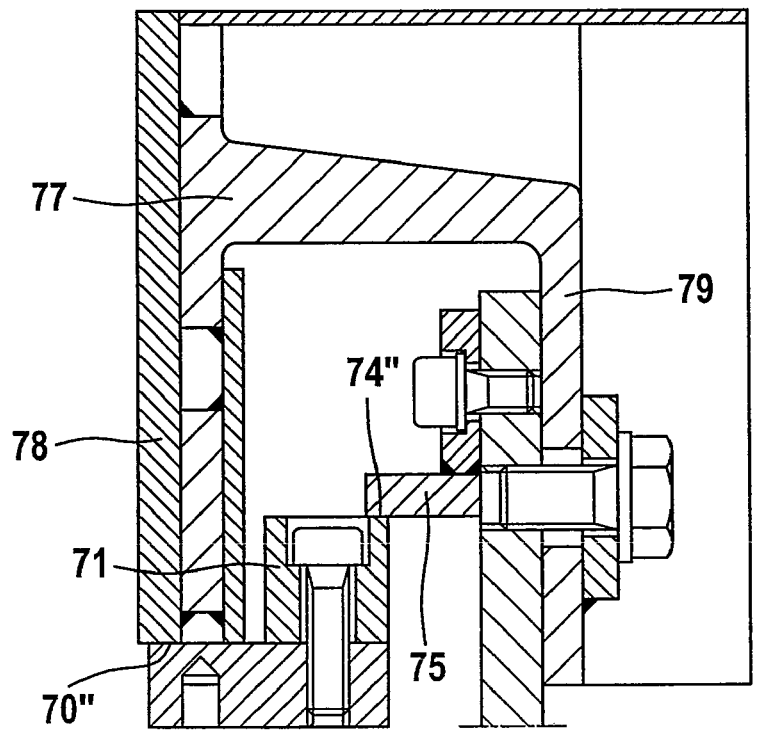
FIG. 7 shows an enlarged part cross-sectional view of a fourth embodiment of a sealing arrangement according to the invention.

In FIG. 7, a further variant of the first embodiment is represented. It differs from the latter essentially by the fact that the sealing elements 70", 74" are of self-adjusting construction. This means that they are made with a sealing gap of zero width (0 mm). In operation, a bedding-in takes place, in the course of which abrasion occurs due to unavoidable production tolerances or different deflections of the components, so that a desired gap size (target gap size) is established relatively quickly, for example in the order of magnitude of about 2 mm (cf. FIG. 4). With such a construction, not only is a more rational production enabled, but a self-adjusting sealing gap is created, the gap size of which ultimately lies closer to the target gap size than would be economically feasible in the case of conventional direct production.

The invention claimed is:

1. An apparatus for cooling bulk material with a gas, comprising:
    a grate configured to convey a layer of the bulk material from a feed end in a direction of conveyance to a delivery end and configured to be flowed through by a cooling gas, wherein the grate comprises a plurality of adjoining planks configured to be moved alternately forward and back in the direction of conveyance;
    a sealing device between the adjoining planks comprising an inner sealing element and an outer sealing element that are spatially separate from one another;
    a conveying duct between the sealing elements configured to run along the length of the adjoining planks; and
    at least one gas supply configured to produce a gas stream along the length of the conveying duct in order to convey bulk material, introduced through one of the sealing elements, to a delivery point.

2. The apparatus of claim 1, wherein the delivery point is arranged at the delivery end.

3. The apparatus of claim 1, wherein the delivery point is the outer sealing element.

4. The apparatus of claims 1, 2, or 3, wherein the grate, in the direction of conveyance, is divided into a pit having a plurality of chambers, wherein the chambers are configured to be subjected to different gas pressures, and wherein a propellant gas source for the conveying duct is connected to one of the chambers having an elevated pressure relative to the conveying duct.

5. The apparatus of claim 4, wherein the conveying duct is chamber-free.

6. The apparatus of claim 1, wherein the outer or inner sealing element is formed by gap or labyrinth seals.

7. The apparatus of claim 6, wherein at least one of the sealing elements is configured to be self-adjusting.

8. The apparatus of claim 1, wherein the outer sealing element is arranged lower than the inner sealing element.

9. The apparatus of claim 1, wherein the sealing device has a protruding bar on a longitudinal edge of one of the adjoining planks and a branched profile, reaching over the protruding bar, on one of the adjoining planks.

10. The apparatus of claim 9, wherein the branched profile forms with a free end of one of its branches, together with the protruding bar, a gap seal acting as the outer sealing element.

11. The apparatus of claim 10, wherein the protruding bar has a step, the flanks of which form a labyrinth seal with the free end of said branch.

12. The apparatus of claims 9, 10, or 11, wherein the branched profile has an additional branch to form a U-shaped profile, which branch is fastened to an upwardly projecting flange disposed on the adjoining plank.

13. The apparatus of claim 9, wherein on the adjoining plank an auxiliary bar is arranged, which forms with the protruding bar a gap seal acting as the inner sealing element.

14. The apparatus of claim 13, wherein the auxiliary bar is configured as an L-shaped profile.

15. The apparatus of claim 13 or 14, wherein the auxiliary bar is disposed on an upright element of the adjoining plank such that the inner sealing element is arranged higher than the outer sealing element.

16. The apparatus of claim 15, wherein the upright element is formed by an upwardly projecting flange disposed on the adjoining plank.

17. The apparatus of claim 9, wherein the inner sealing element is formed between an inner face of the branched profile and an auxiliary plate disposed on the protruding bar.

18. The apparatus of claim 1, wherein downwardly protruding end plates on the mutually opposing longitudinal sides of the adjoining planks form a gas duct, which emerges via the inner sealing element into the conveying duct.

19. The apparatus of claim 1, wherein the conveying duct has a cross section which is 15 to 50 times as large as the width of the sealing elements.

20. The apparatus of claim 1, wherein the inner sealing element has a flow resistance which is less than that of the outer sealing element.

21. The apparatus of claim 20, characterized in that the flow resistance is less by a factor of 2 to 50 times.

\* \* \* \* \*